(12) United States Patent  
Morovic

(10) Patent No.: US 8,432,588 B2  
(45) Date of Patent: Apr. 30, 2013

(54) COLOR MAPPING

(75) Inventor: Jan Morovic, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1960 days.

(21) Appl. No.: 11/256,947

(22) Filed: Oct. 25, 2005

(65) Prior Publication Data

US 2007/0091337 A1    Apr. 26, 2007

(51) Int. Cl.  
*G03F 3/08* (2006.01)

(52) U.S. Cl.  
USPC ........... 358/523; 345/590; 345/600; 358/518; 358/520; 382/167

(58) Field of Classification Search ............ 358/523, 358/1.9, 518, 520; 345/207, 589, 590, 600, 345/602; 382/162, 167  
See application file for complete search history.

(56) References Cited

U.S. PATENT DOCUMENTS

| | | | |
|---|---|---|---|
| 5,937,089 A * | 8/1999 | Kobayashi | 382/167 |
| 6,301,383 B1 * | 10/2001 | Ito et al. | 382/162 |
| 6,414,690 B1 | 7/2002 | Balasubramanian | |
| 6,437,792 B1 | 8/2002 | Ito et al. | |
| 6,724,507 B1 | 4/2004 | Ikegami et al. | |
| 6,882,445 B1 | 4/2005 | Takahashi et al. | |

FOREIGN PATENT DOCUMENTS

| | | |
|---|---|---|
| JP | 08-037604 | 2/1996 |
| JP | 2000-083177 | 3/2000 |
| JP | 2000-278546 | 10/2000 |
| JP | 2000-295488 | 10/2000 |
| JP | 2000-324350 | 11/2000 |
| JP | 2001-197326 | 7/2001 |
| JP | 2001-238091 | 9/2001 |
| JP | 2003-338940 | 11/2003 |

OTHER PUBLICATIONS

MacDonald, L., et al., "A Topographic Gamut Compression Algorithm", Journal of Imaging Science and Technology, vol. 46, No. 1, 53-61 (Jan.-Feb. 2002).  
Katoh et al., "Three-Dimensional Gamut Mapping Using Various Color Difference Formulae and Color Spaces," Journal of Electronic Imaging, vol. 8, No. 4, Oct. 1, 1999, pp. 365-378.  
MacDonald et al., "Evaluation of Colour Gamut Mapping Algorithms," Proceedings of the Spie, vol. 4421, Jun. 24, 2001, pp. 890-893.  
Morovic et al., "The Fundamentals of Gamut Mapping: A Survey," Jul. 2000, Retrieved from the Internet URL:http://www.colour.org/tc8-03/survey/fund_gm.pdf> 36 Sheets.

* cited by examiner

*Primary Examiner* — King Poon  
*Assistant Examiner* — David S Cammack

(57) ABSTRACT

A method of mapping colors which are outside a reproduction device's color gamut to reproducible colors uses a boundary of a reduced gamut. In a three-dimensional color space the reduced gamut is derived from the reproduction device's gamut by reducing its size in all three dimensions. Reduced-gamut clipping-vectors are determined by clipping the out-of-gamut colors onto the reduced-gamut boundary, and the out-of-gamut colors are mapped to those colors at which the reduced-gamut clipping-vectors intersect the reproduction device's gamut boundary. Thus out-of-gamut colors associated with clipping-vectors of different directions that are clipped onto the same point, or adjacent points, of the reduced-gamut boundary are mapped to points spaced apart, or spaced farther apart, on the reproduction device's gamut boundary.

19 Claims, 10 Drawing Sheets

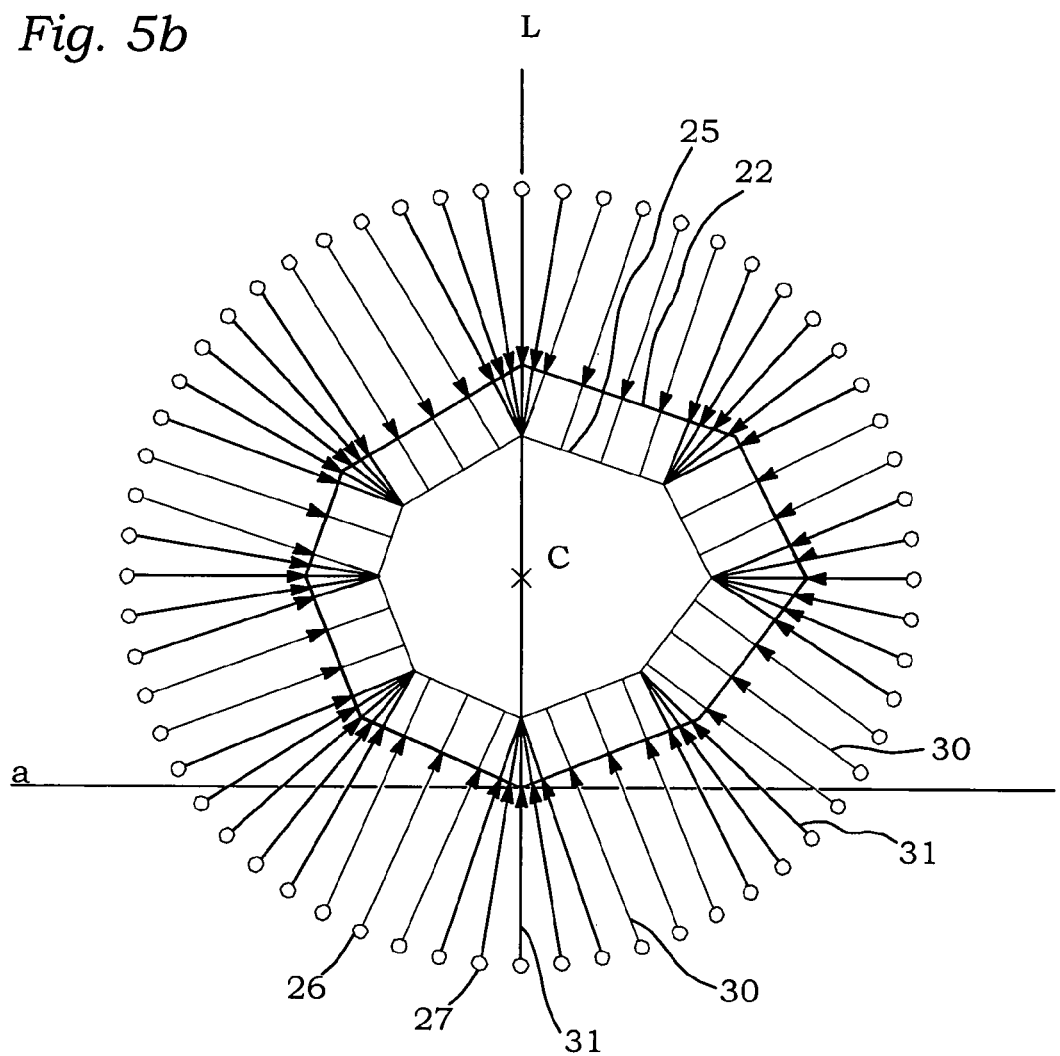

COLOR MAPPING

FIELD OF THE INVENTION

The present invention relates generally to color mapping, and for example, to a method of mapping out-of-gamut colors, as well as a reproduction device and a computer program product arranged to perform an out-of-gamut-color mapping.

BACKGROUND OF THE INVENTION

Image reproduction devices like printers, copiers or monitors cannot produce all the colors a human observer can see. In human visual sensation the basic color appearance attributes are hue, lightness and chroma; hue represents the similarity of a color to "one, or a proportion of two, of the perceived colors, red, yellow, green, and blue" (according to a definition by R. W. G. Hunt). Hue is often represented on a color wheel, ranging from red through yellow, green and blue and back to red, with corresponding hue angles, ranging from 0 to 360 degrees.

The term lightness refers to a color's relative position on a scale whose extremes are black (0) and white (100), and chroma values predict the extent to which a color's hue is manifested, ranging from grey (0) to highly chromatic colors on an open-ended scale.

In accordance with these attributes all visible colors can be represented by points in a three-dimensional color space defined by three axes: one achromatic axis (L), representing the lightness values of the colors, and two chromatic axes (a, b), one of them (a) ranging from highly chromatic green through grey to highly chromatic red, the other chromatic axis (b) ranging from highly chromatic blue through grey to highly chromatic yellow. Any possible visible color can be labeled by a unique set of three coordinates (L, a, b), (L) representing its lightness-value and (a) and (b) together representing its hue and chroma whereby (a) and (b) are orthogonal dimensions whose polar equivalents are a hue (an angle) and chroma (a distance from the (a, b) origin).

There are various color models present besides this Lab system such as the HSV (Hue, Saturation, Value) color space, and its variants: HSB (where B stands for Brightness) and HLS (Hue, Lightness, Saturation); more hardware-oriented color representations for instance are systems such as RGB (Red, Green, Blue), used to communicate color signals for monitors or from scanners and digital cameras, CMY (Cyan, Magenta, Yellow) used in printing devices and calorimetrically defined spaces like YIQ (Y for Luminance, I and Q for chromaticity) used in the American TV system and YUV used in the European TV system. The CIE, the Commission International de l'Eclairage established several standards (including CIE XYZ, CIE L*a*b*, CIE LUV and CIECAM02) for specifying color in terms of human perception. The CIE models form the basis for most quantitative color measurements, where CIE L*a*b* is the CIE's variant of the above-mentioned Lab system of coordinates. The discussion herein takes the Lab model and its equivalent polar representation LCH (Lightness, Chroma and Hue) as a basis without being limited to it.

A device's ability to reproduce colors is limited in all its attributes of lightness, chroma and hue; a printer for instance cannot print a yellow more chromatic than the printer's ink, a monitor cannot show a more chromatic red than the red reproduced by the monitor's red phosphor. Similarly, it is not possible to match all the visible colors with a device's limited colorants.

The colors a device can reproduce form a subspace within the color space, called the reproduction device's color gamut. The surface of this subspace, the gamut's boundary, separates the visible though not reproducible out-of-gamut colors from the visible and reproducible in-gamut colors.

One way of defining a gamut's boundary, without being limited to it, is by its extremes in the achievable values of chroma and lightness at all of the color space's hues. For the purposes of computing this boundary, it can be described mathematically. This can be done by using multivariable equations, forming three-dimensional curved hulls. In another approach a finite number of points are derived empirically, these points representing a selection of extreme chroma- and lightness-values, or value that are extreme in terms of other dimensions derived from LCH, a device can reproduce at all of the color space's hues. These points are then used as corner points (vertices) of an interpolated polyhedron surface approximating the reproduction device's boundary.

If an image, or other set of colors, to be reproduced contains colors that are not reproducible by a device, these out-of-gamut colors are replaced by reproducible ones, i.e. out-of-gamut colors are mapped to colors within the reproduction device's gamut. There is a variety of mapping methods, which can be basically categorized by the terms of clipping and compression. Clipping methods specify a mapping criterion, which is used for finding a point on the reproduction device's gamut boundary to which a given out-of-gamut color is mapped; in-gamut colors are kept unchanged. Compression methods are applied to all the colors of an image to be reproduced, thereby changing, in general, all the colors of the image and distributing these changes across the entire range (in some cases, however, even compression methods leave some colors unchanged).

It is also known in the art to combine these basic mapping methods of clipping and compressing. A commonly used combination for instance involves compressing the lightness range of an image to match the lightness range of a reproduction device's gamut prior to the final clipping.

An article by Lindsay MacDonald, Jan Morovic and Kaida Xiao, "A Topographic Gamut Compression Algorithm" (Journal of Imaging Science and Technology, Volume 46, Number 1, January/February 2002) discloses a compression method wherein a core gamut is constructed inside a destination gamut boundary, in which no compression occurs, i.e. color is preserved unchanged. Size and shape of the core gamut is determined by a core white point and a core black point, and a chroma-scaling factor. Colors outside the destination gamut are compressed into the region between the core and the destination gamut using a quadratic function.

U.S. Pat. No. 6,414,690 proposes using local area information to select a most suitable mapping method for a given pixel associated with an out-of-gamut color. One of several mapping methods to select from is described with reference to FIG. 8; a reduced gamut is defined by reducing the chroma of each surface point of the reproduction device's gamut by a predetermined scale factor. Mapping the out-of-gamut colors on the reproduction device's gamut boundary is performed by clipping the out-of-gamut colors onto the reduced-gamut boundary and then using the intersections of the clipping-vectors with the reproduction device's gamut boundary.

SUMMARY OF THE INVENTION

A method is provided of mapping colors, which are not reproducible by a reproduction device having a color gamut with a gamut boundary, and are therefore outside the reproduction device's color gamut, to colors reproducible by the reproduction device. The method comprises deriving, in a three-dimensional color space, a reduced gamut with a reduced-gamut boundary from the reproduction device's gamut by reducing its size in all three dimensions; determining reduced-gamut clipping-vectors by clipping the out-of-gamut colors onto the reduced-gamut boundary; mapping the out-of-gamut colors to those colors at which the reduced-gamut clipping-vectors intersect the reproduction device's gamut boundary, so that out-of-gamut colors associated with clipping-vectors of different directions that are clipped onto the same point, or adjacent points, of the reduced-gamut boundary are mapped to points spaced apart, or spaced farther apart, on the reproduction device's gamut boundary.

According to another aspect, a method is provided of mapping colors, which are not reproducible by a reproduction device having a color gamut with a gamut boundary, and are therefore outside the reproduction device's color gamut, to reproducible colors. The method comprises deriving, in a two-dimensional color space having a lightness dimension and a chromatic dimension, a reduced gamut with a reduced-gamut boundary from the reproduction device's gamut by reducing its size in both the lightness and chromatic dimensions; determining reduced-gamut clipping-vectors by clipping the out-of-gamut colors onto the reduced-gamut boundary; mapping the out-of-gamut colors to those colors at which the clipping-vectors intersect the reproduction device's gamut boundary, so that out-of-gamut colors associated with reduced-gamut clipping-vectors of different directions that are clipped onto the same point, or adjacent points, of the reduced-gamut boundary are mapped to points spaced apart, or spaced farther apart, on the reproduction device's gamut boundary.

According to another aspect, an image reproduction system having a color gamut with a gamut boundary is provided, arranged to map colors in image data, which are outside the reproduction system's gamut and are therefore not reproducible, into reproducible colors. The color mapping is defined by a method of deriving, in a three-dimensional color space, or in a two-dimensional color space having a lightness dimension and a chromatic dimension, a reduced gamut with a reduced-gamut boundary from the reproduction system's gamut by reducing its size in all its dimensions; determining reduced-gamut clipping-vectors by clipping the out-of-gamut colors onto the reduced-gamut boundary; mapping the out-of-gamut colors to those colors at which the reduced-gamut clipping-vectors intersect the reproduction system's gamut boundary, so that out-of-gamut colors associated with clipping-vectors of different directions that are clipped onto the same point, or adjacent points, of the reduced-gamut boundary are mapped to points spaced apart, or spaced farther apart, on the reproduction system's gamut boundary.

According to another aspect, a computer program product is provided which is either in the form of a machine-readable medium with program code stored on it, or in the form of a propagated signal comprising a representation of program code. The program code is arranged to carry out a method, when executed on a computer system, of mapping colors which are not reproducible by a reproduction device having a gamut with a gamut boundary, and are therefore outside the reproduction device's gamut, to colors reproducible by the reproduction device. The color mapping is defined by deriving, in a three-dimensional color space, or in a two-dimensional color space having a lightness dimension and a chromatic dimension, a reduced gamut with a reduced-gamut boundary from the reproduction device's gamut by reducing its size in all its dimensions; determining reduced-gamut clipping-vectors by clipping the out-of-gamut colors onto the reduced-gamut boundary; mapping the out-of-gamut colors to those colors at which the reduced-gamut clipping-vectors intersect the reproduction device's gamut boundary, so that out-of-gamut colors associated with clipping-vectors of different directions that are clipped onto the same point, or adjacent points, of the reduced-gamut boundary are mapped to points spaced apart, or spaced farther apart, on the reproduction device's gamut boundary.

According to another aspect, a mapping table is provided which is either stored on a machine-readable medium, or is in the form of a propagated signal, for an image processor to map colors which are not reproducible by a reproduction device having a gamut with a gamut boundary, and are therefore outside the reproduction device's gamut, to colors reproducible by the reproduction device. The mapping is a result of a method of deriving, in a three-dimensional color space, or in a two-dimensional color space having a lightness dimension and a chromatic dimension, a reduced gamut with a reduced-gamut boundary from the reproduction device's gamut by reducing its size in all its dimensions; determining reduced-gamut clipping-vectors by clipping the out-of-gamut colors onto the reduced-gamut boundary; mapping the out-of-gamut colors to those colors at which the reduced-gamut clipping-vectors intersect the reproduction device's gamut boundary, so that out-of-gamut colors associated with clipping-vectors of different directions that are clipped onto the same point, or adjacent points, of the reduced-gamut boundary are mapped to points spaced apart, or spaced farther apart, on the reproduction device's gamut boundary.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 5b illustrates the present reduced-gamut-clipping method according to some of the embodiments, applied to the conventional method of clipping via the shortest distance;

Figure 1A:
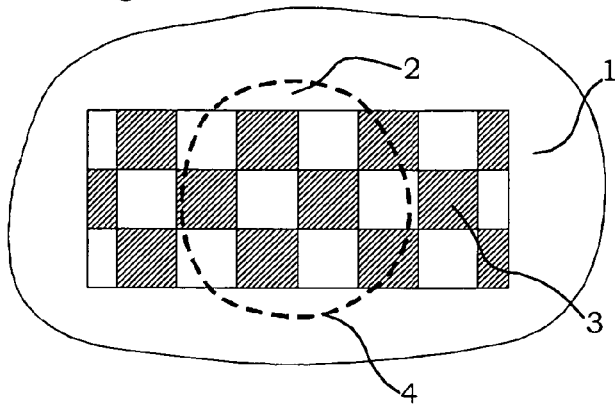
FIG. 1a-e illustrate methods of mapping out-of-gamut colors by compressing and by clipping.

The drawings and the description of the drawings are of embodiments of the invention and not of the invention itself.

DESCRIPTION OF THE PREFERRED EMBODIMENTS

FIG. 1a-d, show diagrams related to an example of an image containing colors a certain device cannot reproduce. Before proceeding further with the detailed description of FIG. 1, however, a few items of the embodiments will be discussed.

As mentioned at the outset, images reproduced by printers, copiers, monitors, projectors or other imaging devices are supposed to match the colors of the original as closely as possible, i.e. the reproduction should cause as similar a sensation to the human visual system as the original.

The human visual system perceives colors basically in three attributes, the color's hue, chroma and lightness.

But a device's ability to reproduce colors as they appear in the real world is limited by the technology it uses. The colors a device can reproduce are a subset of the set of all the visible colors; they form a sub-space within the color space, called the reproduction device's color gamut. The surface of this sub-space, the gamut boundary, separates the reproducible in-gamut from the non-reproducible out-of-gamut colors.

When an image contains colors out of the reproduction device's color gamut, these out-of-gamut colors are replaced by reproducible ones, i.e. the non-reproducible colors are mapped to in-gamut colors. The basic mapping methods mentioned above—clipping and compressing—both introduce a certain amount of method-specific distortion in the reproduced image; the objective is to keep these distortions to a minimum and to avoid disturbing artifacts.

In the embodiments, out-of-gamut colors are mapped onto reproducible colors by clipping them onto the gamut's boundary, as will be explained below in more detail. Visible artifacts such as blocking or contouring typically result from clipping, since this mapping method discards variation in out-of-gamut regions; parts of an image containing detail can thus end up losing it. A single color on the reproduction device's gamut boundary may substitute a multitude of out-of-gamut colors differing from each other. A smooth shading for example would be reproduced as a sequence of distinct areas of constant colors with sudden color changes from one area to another.

In some of the embodiments such effects are reduced because an underlying clipping method (i.e. any clipping which conventionally would be used) has been modified such that a reduced gamut is derived from the reproduction device's color gamut by reducing the chromatic attributes (a, b) of each of its surface points, mapping-vectors are determined by clipping the out-of-gamut colors onto the reduced-gamut's boundary according to the underlying clipping criterion, and the out-of-gamut colors are finally mapped to those colors of the reproduction device's gamut boundary at which the reduced-gamut clipping-vectors intersect the reproduction device's gamut boundary. Thus out-of-gamut colors associated with clipping-vectors of different directions that would be clipped onto the same point, or adjacent points, of the reduced-gamut boundary by the non-modified underlying clipping method, are finally mapped to points spaced apart, or spaced farther apart, on the reproduction device's gamut boundary. This is similar to the method described in U.S. Pat. No. 6,414,690 with reference to FIG. 8, wherein the reduced gamut is derived by scaling the reproduction device's gamut in two—the chromatic ones (a, b)—of its three dimensions by the same scaling factor, while leaving the third (i.e. the—achromatic—lightness dimension L) unchanged (column 6, line three: "a reduced gamut is defined by reducing the chroma of each surface point by a predetermined scale factor").

By contrast, in some of these embodiments the reduced gamut is derived from the reproduction device's gamut by reducing its size in all three dimensions L, a and b, i.e. by reducing the chromatic (a, b) and the achromatic (L) attributes of each of its surface points, whereby the scale factors can (but do not have to) be different in each of the three dimensions.

It should be understood that reducing the chromatic attributes (a, b) of a color does not necessarily reduce (or enlarge) the color's hue angle; the color's hue is kept constant then (and only then), if both of the color's chromatic attributes (a, b) are reduced by the same factor. If a polar representation of a color space by lightness, hue and chroma is used, and a gamut is reduced by reducing the lightness and the chroma of each of its surface points, the size of this gamut is reduced in all three dimensions—even when the hues of the gamut's surface points are kept constant.

An individual hue leaf, i.e. a plane of constant hue, can be thought of as a two-dimensional color space, spread out by the two axes lightness and chroma. In this two-dimensional color space a reproduction device's (three-dimensional) gamut has a two-dimensional footprint, with a curved or a polygonal outline as a two-dimensional gamut boundary. In some of the embodiments, explained in more detail below, the reduced gamut is derived in such a two-dimensional color space by reducing the size of the reproduction device's gamut in both of its dimensions (lightness and chroma).

Each hue angle within the 0 to 360 degrees range can be associated with an individual two-dimensional color space; the three-dimensional color space can be described as the totality of all the possible individual hue leaves, the totality of the two-dimensional gamut boundaries within these leaves form the boundary of the reproduction device's three-dimensional gamut, and the totality of the reduced two-dimensional boundaries within these leaves form a three-dimensional reduced-gamut boundary. As mentioned above, the three-dimensional reduced gamut is smaller in size than the reproduction device's three-dimensional gamut in all the three dimensions. This is in contrast to U.S. Pat. No. 6,414,690, wherein the reduced gamut is defined by reducing the chroma of each surface point by a predetermined scale factor, i.e. by scaling the reproduction device's gamut in two—the chromatic ones (a, b)—of its three dimensions by the same scaling factor, while leaving the third (L) unchanged.

Figure 8:
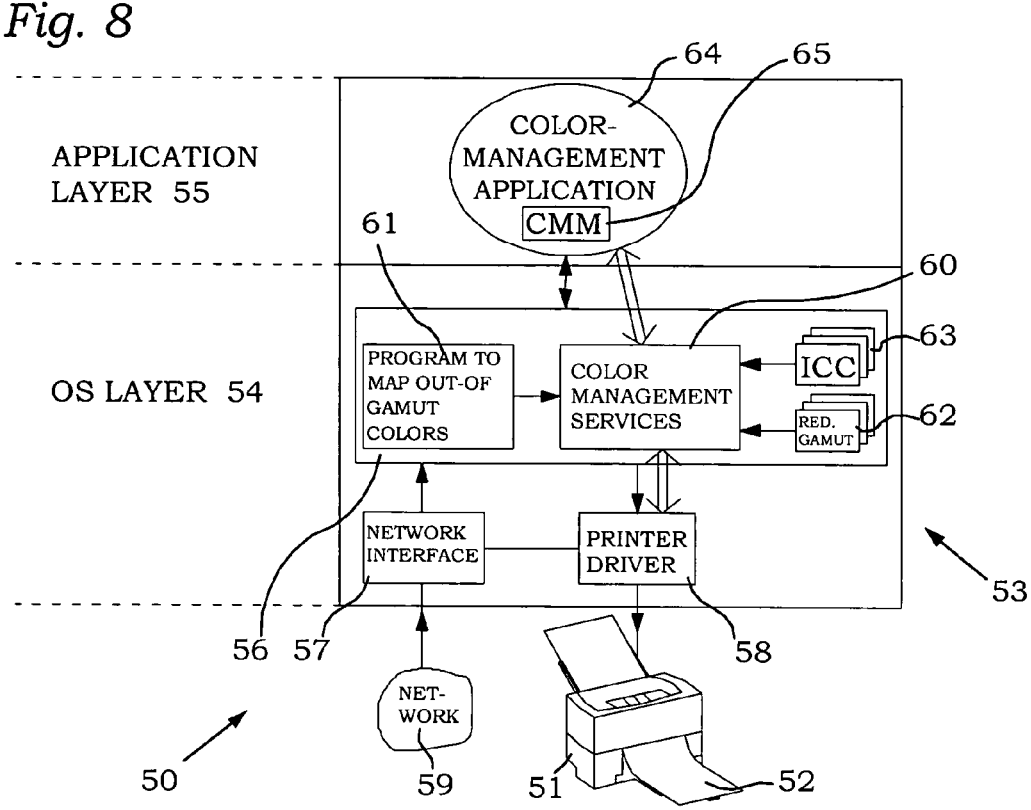
FIG. 8 is a high-level diagram of a reproduction system.

The polygons shown in FIG. 8 of U.S. Pat. No. 6,414,690 represent such a two-dimensional gamut boundary and a reduced-gamut boundary in the two chromatic (a, b) dimensions, but are not a two-dimensional representation of the sort described above, where the gamut is (also) reduced in the lightness dimension.

Clipping-specific distortion occurs more often within those regions of a gamut's surface wherein a given clipping method generates sudden changes of the directions of the clipping vectors, so that clipping vectors occur oriented radially towards single points or small areas of a gamut boundary. In general, given two surfaces, where one lies inside the other, such as the gamut and the reduced gamut, lines or vectors radially oriented towards a single point of the inner surface intersect the outer surface at a plurality of points; lines or vectors oriented radially towards small areas of the inner surface intersect the outer surface at points spread apart over a larger area. Thus, due to this spreading effect, the clipping-specific distortions are reduced. This is largely independent from any specific underlying clipping criterion. The present reduced-gamut-clipping method is a modification of existing clipping methods based on a manipulation of the device's gamut, but not of the clipping criterion itself. It can therefore be performed using most of the commonly used clipping criteria as a basis, and can thus be considered as a "meta clipping method". Due to this, the specific features of a chosen one of the common clipping criteria are maintained (e.g. hue preserving), while the distortions mentioned above are reduced, when the reduced-gamut-clipping method according to some of the embodiments is applied.

In some of the embodiments, the shape and position of the reduced gamut is obtained by scaling the reproduction device's gamut towards one scaling center, which is a point within the reproduction device's gamut. In other embodiments, more than one scaling center, e.g. two scaling centers, inside the reproduction device's gamut are used. For example, in embodiments with two scaling centers, the reproduction device's gamut surface is divided into two regions, and the surface points lying in the first region are scaled towards the first scaling center, whereas the surface points lying in the other region are scaled towards the other scaling center. The subdivision of the gamut surface can, for example, be defined by a certain lightness value; i.e. surface points with a lightness value above the certain lightness value are scaled towards the first scaling center, wherein those having a smaller lightness value are scaled towards the second scaling center. In some of the embodiments, the "certain lightness value" is the lightness value of a cusp of the reproduction device's gamut (i.e. a lightness value with maximum-possible color saturation or chroma).

In some embodiments the scaling center (or scaling centers) is located anywhere within the reproduction device's gamut apart from the lightness axis. In other embodiments, the scaling center (or scaling centers) is located on the lightness axis, since the lightness axis is the geometric location of all the grey-points (i.e. the colors with a chroma value of zero) and is thus, in a certain sense, a gamut symmetry axis.

In some of the embodiments, the scaling is a linear scaling towards a single scaling center. "Linear scaling" means that the lines connecting the scaling center (which is considered as fixed) and the different surface points on the reproduction device's gamut surface are shortened by a common factor. As a consequence, angles and shapes of the original reproduction device's gamut surface are conserved in the gamut-size reduction procedure, and surface elements projected from the reproduction device's gamut surface to the reduced-gamut surface are parallel, be they curved or plane surface elements. Due to this parallelism-conserving feature of linear scaling, the clipping result obtained with the present reduced-gamut-clipping method is the same as the one obtained with the corresponding "original clipping method" outside those regions in which the original clipping method would result in clipping-specific distortions (as mentioned above), if the underlying clipping criterion depends on the angular orientation of the gamut surface. In other words, the effect of the present reduced-gamut-clipping method is then limited to those regions in which the clipping-specific distortions (mentioned above) occur. In the sense of the "meta-clipping method" mentioned above, in embodiments with linear scaling the underlying clipping method is maintained to an even larger extent than in the more general case of a non-linear scaling.

Some of the embodiments use a clipping criterion according to which out-of-gamut colors are clipped via the shortest distance (also called herein minimum-color-distance clipping). The shortest distance condition defines the directions of the mapping-vectors as perpendicular (i.e. normal) to those regions of a gamut boundary, where an unambiguous normal (i.e. an unambiguous perpendicular line) exists (since an ambiguity may occur if the gamut is not convex, in some embodiments the gamut and the reduced gamut are convex). However, a gamut boundary typically has corners and/or edges, and for such corners/edges no unambiguous normal exists (for example a gamut surface composed of plane polygonal sub-surfaces has corners/edges, the corners/edges are at the "seams" of the sub-surfaces). Nevertheless, there are out-of-gamut colors, which are in a minimum distance to a corner (or a point on an edge), and there is even a multitude of out-of-gamut colors, which are in the minimum distance to the corner/point on the edge, namely all those out-of-gamut colors which are in a radial region of the corner/point on the edge. If the conventional minimum-color-distance clipping method were used (without using a reduced gamut as described herein) all these colors would be mapped onto the corner/the point on the edge, i.e. onto a single point on the edge. Mapping these colors onto the gamut boundary in this manner would therefore lead to a distortion, which is an example for the above-mentioned clipping specific distortions. However, since according to the present reduced-gamut-clipping method, the out-of-gamut colors are first clipped on the reduced-gamut boundary and are then mapped to the vector intersections with the gamut boundary, those out-of-gamut colors, which are clipped onto one point (now on the reduced gamut), are finally mapped to points spaced apart. In the embodiments using a minimum-color-distance clipping criterion and in which the gamut is reduced by linear scaling, as described above, out-of-gamut colors outside the radial-distortion regions are mapped to those colors on the reproduction device's gamut boundary which are at minimum distance, and those out-of-gamut colors inside the radial-distortion regions are mapped to colors on the reproduction device's gamut boundary which are not strictly at minimum distance. Thus, these embodiments represent a modified minimum-color-distance clipping method in which the mapping result (i.e. minimum distance mapping) is only modified in the radial-distortion regions in order to reduce the clipping distortion (by contrast, the method used in U.S. Pat. No. 6,414,690 mentioned at the outset does not preserve the minimum-color-distance condition outside distortion regions because there is no parallelism between surface elements of the gamut and the reduced gamut).

In general, when an out-of-gamut color is mapped onto a gamut boundary via the shortest distance, the out-of-gamut color's hue differs from the mapped color's hue; in many of the cases the mapping-vector defined by the minimum distance criterion does not run within the out-of-gamut color's hue leaf (it will only run in the hue leaf considered, if the gamut surface at the region of interest is such, that an unambiguous normal exists and the normal runs within the hue leaf).

In some of the embodiments out-of-gamut colors are mapped without changing their hue, i.e. the underlying clipping method is a hue-preserving clipping. Each out-of-gamut color is associated with a color contained in its hue leaf, which, as described above, can be thought of as a two-dimensional color space, i.e. a plane spread out by the two axes lightness and chroma, whereby all points within that two-dimensional color space have the same hue. So mapping one color in this hue leaf onto another color within the same leaf preserves the color's hue.

In this two-dimensional color space a reproduction device's (three-dimensional) gamut has a two-dimensional footprint, with a curved or polygonal outline as a two-dimensional gamut boundary. Since all points on this boundary and the point representing the color to be mapped lie within one hue leaf, mapping the color onto the two-dimensional gamut boundary preserves the color's hue (i.e., this mapping method is a hue-preserving clipping method).

In some of these embodiments the (hue-preserving) clipping vectors running within an individual hue leaf run in the direction of the shortest distance towards the two-dimensional gamut boundary, described above as the footprint of the device's (three-dimensional) gamut boundary within the individual hue leaf. As said before, the shortest distance condition defines the directions of the clipping vectors as perpendicular (i.e. normal) to the gamut boundary for those segments of the boundary, wherein unambiguous normals (perpendicular lines) exist, i.e. those segments of the boundary that have the form of convex curves or straight lines. Typically a boundary has corners (vertices), i.e. points, in which the boundary is sharply bent. A corner can be described as a point, at which a first (curved or straight) and a second (curved or straight) segment of the boundary meet; at this point the normal of the first segment has a first direction and the normal of the second segment has a second direction, whereby the first direction is different from the second one. Each normal-pair at each corner of the boundary forms an angular sector, and all the points within such an angular sector have the same nearest neighbor point on the boundary, which is the boundary's corner at which the angular sector has its vertex point. So the minimum distance clipping criterion defines two classes of clipping vectors, one class of vectors perpendicular to the boundary's curved or straight segments, and a second class of vectors oriented radially towards the boundary's corner(s).

This method of clipping colors without changing their hue, and, within an individual hue leaf, in the direction of the shortest distance to the (two-dimensional) gamut boundary is a hue-preserving minimum-distance clipping. It should be understood that colors clipped using this method are clipped in the direction of the shortest distance to the two-dimensional footprint of the gamut boundary within an individual hue leaf. However, they are clipped to the three-dimensional gamut surface in the strict direction of the shortest distance in general only then, if the gamut boundary has a specific form, such as, for instance, the form of a surface of revolution with the achromatic (lightness) axis as the axis of rotation.

The hue-preserving minimum-distance clipping is used in these embodiments with the reduced-gamut-clipping modification, i.e., the hue-preserving minimum-distance vectors are defined using a reduced-gamut boundary, and the out-of-gamut colors are finally mapped to the intersection points of these vectors at the device's gamut boundary.

In some of the embodiments a reduced gamut boundary is derived from the device's gamut boundary in a sectional plane of the three-dimensional color space, this plane being spread out by the achromatic (lightness) axis and one chromatic axis, thus forming a two-dimensional color space. Within this plane the device's gamut leaves a two-dimensional curved or polygonal footprint. Reducing this curve or polygon within the plane in both of its dimensions leads to a two-dimensional reduced gamut boundary.

In some of these embodiments the reduced-gamut-clipping method is used within this plane; i.e., the mapping-vectors are determined by clipping the out-of-gamut colors residing within this plane onto the (two-dimensional) gamut boundary according to the underlying clipping criterion, and the out-of-gamut colors are finally mapped to the points of intersection of these mapping vectors and the (two-dimensional) curved or polygonal footprint of the device's gamut boundary. The colors not reproducible by a device in general do not all lie within a single plane; they are rather distributed in all the three dimensions of the (three-dimensional) color space. To map them all onto reproducible ones a multitude of planes are set, all these planes reaching out from the lightness axis, each plane in the hue direction of an individual out-of-gamut color or out-of-gamut colors within the same hue, so that each out-of-gamut color is captured by one of these, and for all out-of-gamut colors within such an individual plane the two-dimensional reduced-gamut-clipping method is used.

The method described herein may be "segmented" in different ways, wherein the different "segmentations" lead to the same mapping result. For example, in some embodiments, both (i) the construction of the reduced-gamut boundary and (ii) the derivation of the reduced-gamut clipping vectors and their gamut-intersection points to actually map the colors are performed "on the fly" (since a reduced-gamut boundary is valid for a certain printer-print media combination, one and the same reduced-gamut boundary may be used to map many colors for such a combination; thus, in some of these on-the-fly embodiments the construction (i) is carried out once at the beginning, and the derivation (ii) is then carried out many times, for the different colors to be mapped).

Other embodiments give the same result as the on-the-fly embodiments above, but the execution is segmented in a different manner: The construction of the reduced-gamut boundary ((i) above) is done separately, and the reduced-gamut boundary obtained is then stored permanently to be used on demand (it may, for example, be constructed by a printer manufacturer and a parameterization of the reduced-gamut boundary may be sold together with the printer, e.g. stored in the printer's firmware, or as a part of a printer driver, etc.). Only the derivation (ii) is then carried out "on the fly".

Other embodiments segmented in a still other way give the same result as the ones above, but not only the construction (i) is performed once and stored, but also the derivation (ii) is performed once and stored, for example for a grid of colors. The results are then represented in a mapping table, which is stored and may be later used to map colors on request.

Since the mapping result in all these embodiments is the same, the present patent covers all the reduced-gamut clipping methods making use of a gamut-size reduction in all dimensions (and reproduction systems and computer program products based on these methods), irrespective of how the method execution is segmented. Therefore, the claims directed to the reproduction system and the computer program product are not drafted in a way that the reproduction system or computer program is arranged to carry out a certain method, but that it is arranged to carry out a color mapping defined by the certain method.

The reproduction system of some embodiments is a computer programmed to perform the color mapping and linked to a printing, display, projection or other imaging device, which reproduces (prints) the digitally-represented image on a print media, such as paper. In other embodiments, the computer programmed to perform the color mapping is integrated into the printing device. The printing device itself is, for example, an ink-jet printer, e.g. thermal or piezo drop-on-demand, continuous-flow or solid-ink printer, an electrophotographic printer with solid or liquid toner, a dye sublimation, a digital photo printer, a SWOP press, etc.

Some embodiments of the computer program product include a machine-readable medium on which the program code to perform the color mapping described is performed. A "machine-readable medium" is any medium that is capable of storing or encoding data representing the device color profile. The term "machine-readable medium" shall accordingly be taken to include, for example, solid state memories and, removable and non-removable, optical and magnetic storage media.

A representation of the computer program product in the form of a propagated signal is an embodiment, which enables the program code to be distributed over a network, such as the Internet or a private network. As with software in general, this is likely to become the usual way of transmitting and distributing the program code.

A mapping table is a data product to map colors. It may be sold together with the reproduction device, but may also be commercialized by software manufacturers or mapping table providers without hardware, either as a "pure" table, or together with program code, or embedded in a document. The mapping table may also be stored on a machine-readable medium or be transmitted over a network as a propagated signal.

Returning now to FIG. 1a-d which illustrate an example of an image containing colors a certain device cannot reproduce:

FIG. 1a shows a larger circular area 1 representing the set of all the visible colors; a smaller circular area 2 within the larger one 1 represents the set of the (in gamut) colors a certain device can reproduce, and a rectangle 3 within the large area 1 represents the set of the colors of an image to be reproduced. A part of the rectangle 3 falls within the dashed outline 4 of the smaller circular area 2; this part of the rectangle 3 represents the image's colors reproducible by the certain device; the dashed outline 4 symbolizes the device's gamut boundary.

Figure 1B:
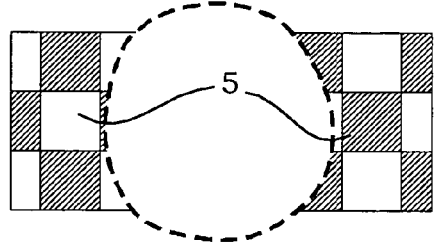

FIG. 1b shows the set 5 of the image's colors which are out of the certain device's gamut; to reproduce the image, the out-of-gamut colors have to be mapped to reproducible ones, which is basically done either by compressing the whole image or by clipping the out-of-gamut colors onto the boundary of the device's gamut.

Figure 1C:
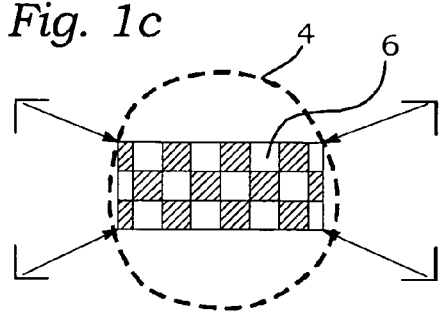

FIG. 1c shows the set 6 of the image's colors after the image has been compressed such that all the colors of the compressed image are within the device's gamut boundary 4. (Compression methods, as mentioned at the outset, are applied to all the colors of an image to be reproduced, thereby changing, in general, all the colors of the image and distributing these changes across the entire range).

Figure 1D:
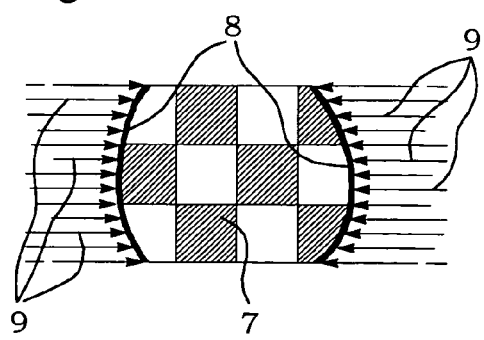

FIG. 1d illustrates the mapping by clipping method, wherein the set 7 of reproducible image colors are kept unchanged while out-of-gamut colors are clipped onto regions 8 of the device's gamut boundary. Clipping vectors 9 are determined by an underlying clipping criterion.

Figure 1E:
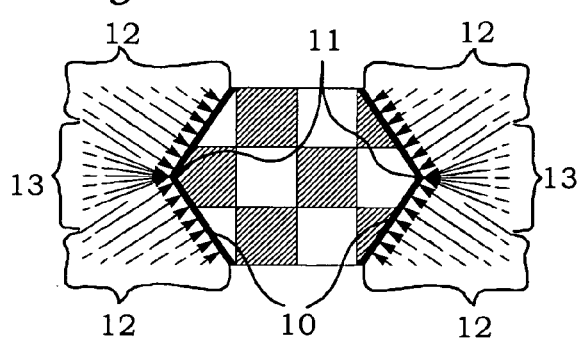

FIG. 1e shows a boundary 10 having corners 11; a minimum distance clipping condition defines two classes of clipping vectors, one class 12 of vectors perpendicular to the boundary's straight segments, and a second class 13 of vectors oriented radially towards the boundary's corners 11.

Figure 2:
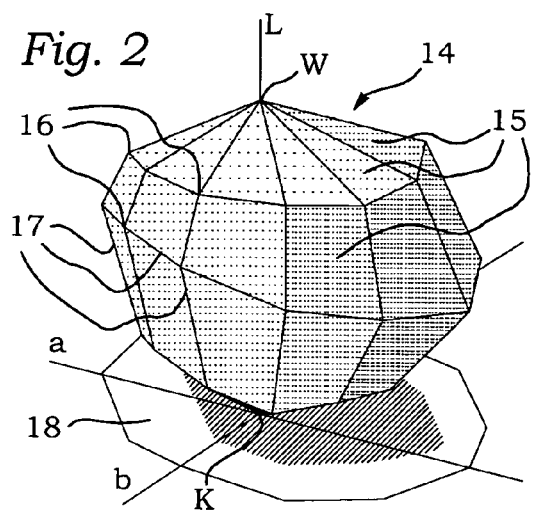
FIG. 2 shows a device's gamut in a three-dimensional color space.

FIG. 2 shows a three-dimensional body 14 representing a certain device's gamut residing in a color space (L, a, b) spread out by two horizontal (the chromatic) axes a and b and a vertical axis L (lightness); the gamut surface (i.e. the gamut boundary) is composed of plane polygonal sub-surfaces 15 and has corners 16 and edges 17; a vertical projection of the gamut onto the horizontal plane spread out by the chromatic axes a and b forms a polygon 18 within this a-b plane.

Figure 3A:
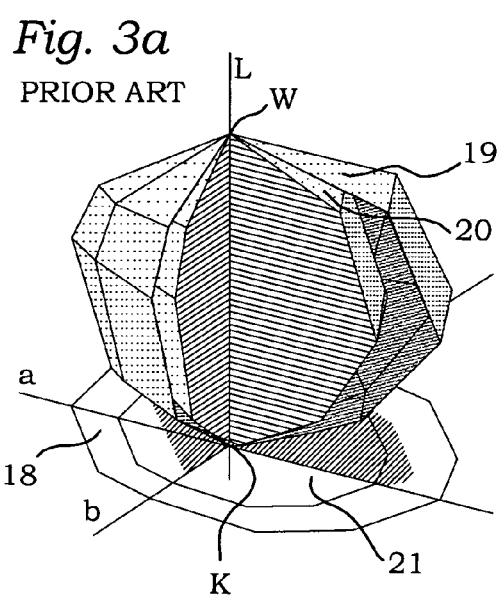
FIG. 3a-b show a gamut reduced according to the prior art.
Figure 3B:
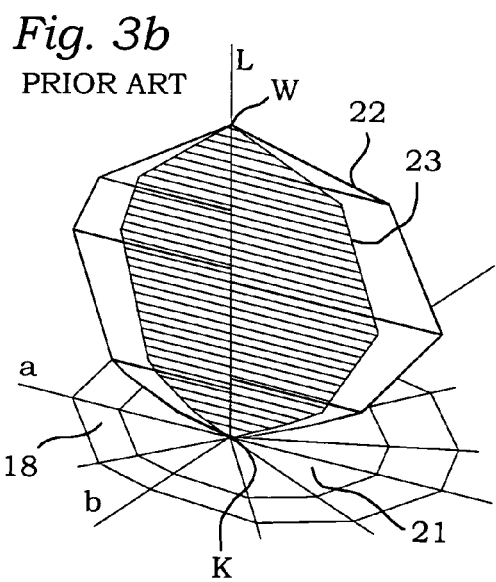

FIG. 3a-b show a reduced gamut boundary derived from the device's gamut boundary according to the method described in U.S. Pat. No. 6,414,690:

FIG. 3a shows a three-dimensional cutaway view of the device's gamut boundary 19 and the reduced gamut boundary 20 which is derived from the device's gamut boundary by scaling it in two—the chromatic ones (a, b)—of its three dimensions by the same scaling factor s while leaving the third (i.e. the—achromatic—lightness dimension L) unchanged. A vertical projection of the reduced gamut boundary 20 onto the a-b plane forms a polygon 21 which is the polygon 18 (i.e. the projection of the device's gamut boundary) scaled down towards the intersection point of the axes a and b by the scaling factor s.

FIG. 3b shows a section in the L-a plane of the device's gamut boundary and the reduced gamut boundary (derived from the device's gamut boundary according to the method described in U.S. Pat. No. 6,414,690), and the vertical projections 18 and 21 of the gamut and the reduced gamut. In the sectional view the device's (two-dimensional) gamut boundary forms an outer polygon 22, and the reduced gamut boundary forms an inner polygon 23. The two polygons 22 and 23 have two points W and K in common; these points W and K are the intersection points of the polygons with the lightness axis L and represent the gamut's colors of maximum and minimum lightness, i.e. the white point W and the black point K of the gamut. The chromatic values of both these points are zero and remain therefore unchanged when multiplied by a scaling factor s (0×s=0).

Figure 4A:
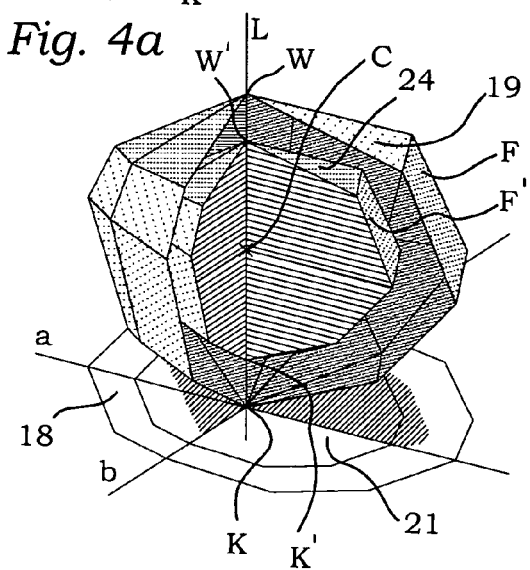
FIG. 4a-b show a gamut reduced according to one of the embodiments.
Figure 4B:
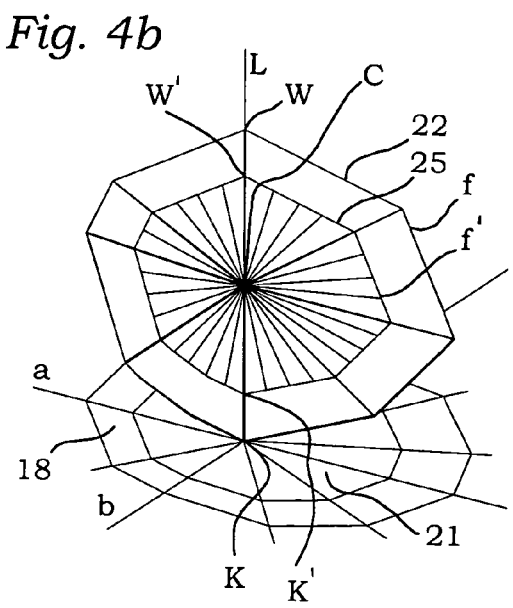

FIG. 4a-b show a reduced gamut boundary derived from the device's gamut boundary according to some of the embodiments:

FIG. 4a shows a three-dimensional cutaway view of the device's gamut boundary 19 and the reduced gamut boundary 24 which is derived from the device's gamut boundary by scaling it towards a scaling center C in all of its three dimensions (L, a, b) by the same scaling factor s, and the vertical projections 18 and 21 of the gamut 18 and the reduced gamut 21 onto the a-b plane.

FIG. 4b shows a section in the L-a plane of the device's gamut boundary and the reduced gamut boundary (derived from the device's gamut boundary by scaling it towards a scaling center C in all of its three dimensions (L, a, b) by the same scaling factor s), and the vertical projections 18 and 21 of the gamut boundary and the reduced gamut boundary onto the a-b plane. In the sectional view the device's (two-dimensional) gamut boundary forms the outer polygon 22, and the reduced gamut boundary forms an inner polygon 25. Due to the scaling method used to derive the reduced gamut boundary from the device's gamut boundary each side of the inner polygon is parallel to a respective side of the outer one, and, referring back to FIG. 4a, each subsurface of the reduced gamut boundary is parallel to a respective subsurface of the device's gamut boundary. For example, in FIG. 4a subsurface F' of the reduced gamut boundary 24 is parallel to subsurface F of the device's gamut boundary 19; in FIG. 4b side f of the inner polygon 25 is parallel to side f of the outer one 22.

Figure 5A:
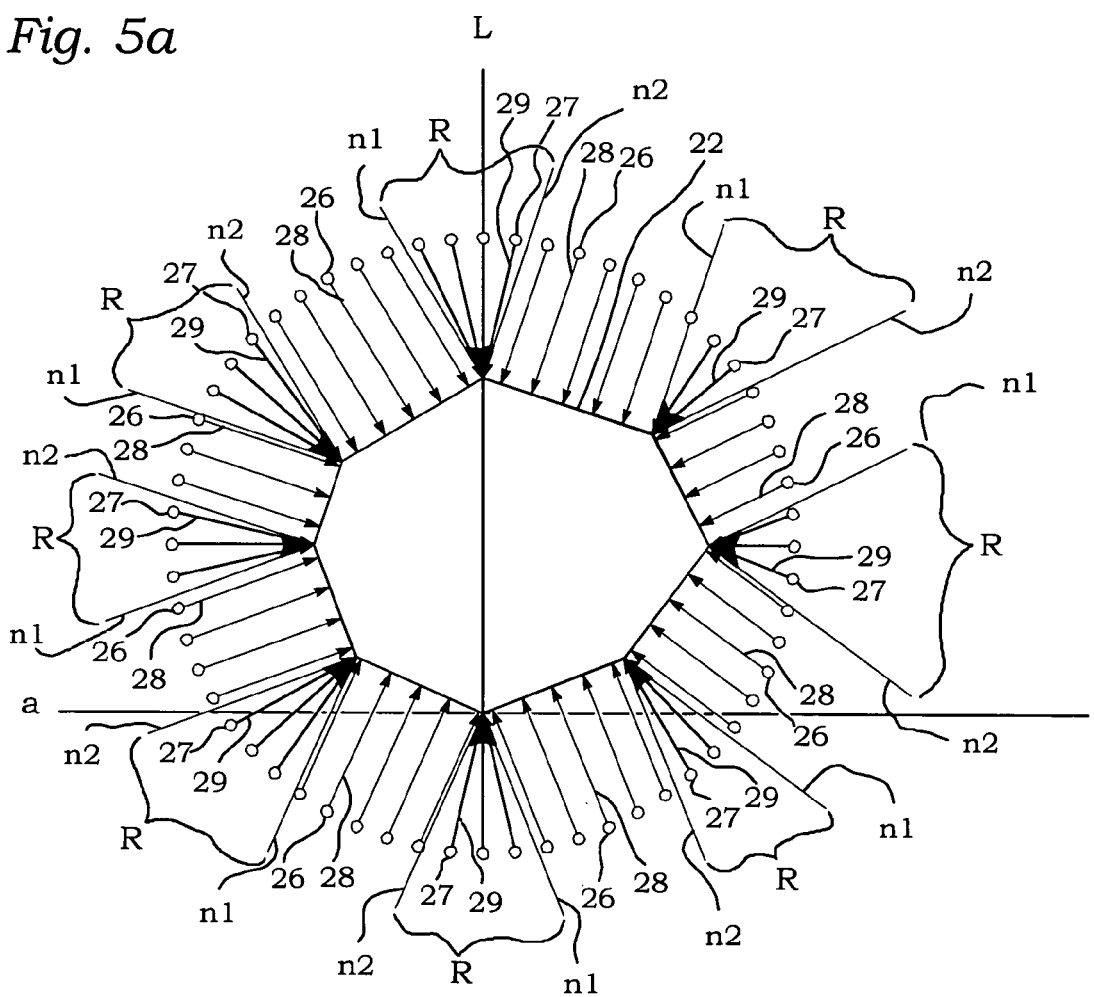
FIG. 5a illustrates a conventional method of mapping out-of-gamut colors by clipping via the shortest distance.

FIG. 5a illustrates a mapping of out-of-gamut colors by clipping them onto the gamut boundary via the shortest distance, and a distortion typical for this mapping method.

The polygon 22 represents the boundary in the section of the device's gamut in the L-a plane; within this section a set of out-of-gamut colors symbolized by small circles 26 and 27 are equally distributed along a circle around the polygon 22 (the boundary). The minimum distance clipping criterion defines two classes of clipping vectors, one class of vectors 28 perpendicular to the boundary's straight segments (the sides of the polygon 22), and a second class of vectors 29 oriented radially towards the boundary's corners (the vertices of the polygon 22). Vectors 29 of the second class occur in angular sectors R formed by pairs of normals at the vertices—one normal n1 of the pair oriented perpendicular to one side of the polygon and the second normal n2 of the pair perpendicular to the adjacent side. Out-of-gamut colors clipped along the vectors 28 (perpendicular to the boundary) preserve their difference properties to some extent, while all out-of-gamut colors within an angular sector R are clipped onto one single (corner) point of the boundary, thus the differences of these colors are discarded. As a consequence, a certain kind of clipping-specific distortion tends to occur more often in the region of vertices (and edges) of a gamut boundary.

FIG. 5b illustrates the present reduced-gamut-clipping method according to some of the embodiments, applied to the method of clipping via the shortest distance. As in FIG. 4b a section in the L-a plane shows a device's gamut boundary as outer polygon 22 and a reduced gamut boundary as inner polygon 25; the reduced gamut boundary is derived from the device's gamut boundary by scaling it towards a scaling center C in all of its three dimensions (L, a, b) by the same scaling factor s, and therefore each side of the inner polygon 25 is parallel to a respective side of the outer one 22. Small circles 26 and 27, distributed along a circle around the polygon 22 (the boundary), represent a set of out-of-gamut colors within the section. Vectors lead from the small circles to the inner polygon 25 via the shortest distance, and the intersection points of these shortest-distance-vectors with the outer polygon 22 represent the colors mapped according to this modified minimum-distance clipping method. The modified method maps different colors 27 in the radial sectors R at the corners/edges of the device's gamut to points spaced apart from another where the unmodified method would map them group-wise onto single points on the gamut boundary. However, shortest-distance-vectors 30 perpendicular to the sides of the inner polygon 25 used with the modified method intersect the outer polygon 22 in the same points as the perpendicular vectors 28 used in the unmodified method, since the respective sides of the inner 25 and the outer polygon 22 are parallel.

So the results of the modified and the unmodified method differ only in the regions of the angular sectors R at the corners/edges of the device's gamut, where the modified clipping method according to these embodiments preserves to some extent the differences of the out-of-gamut colors, thus reducing the distortion that would occur when the unmodified clipping method is used.

Figure 5C:
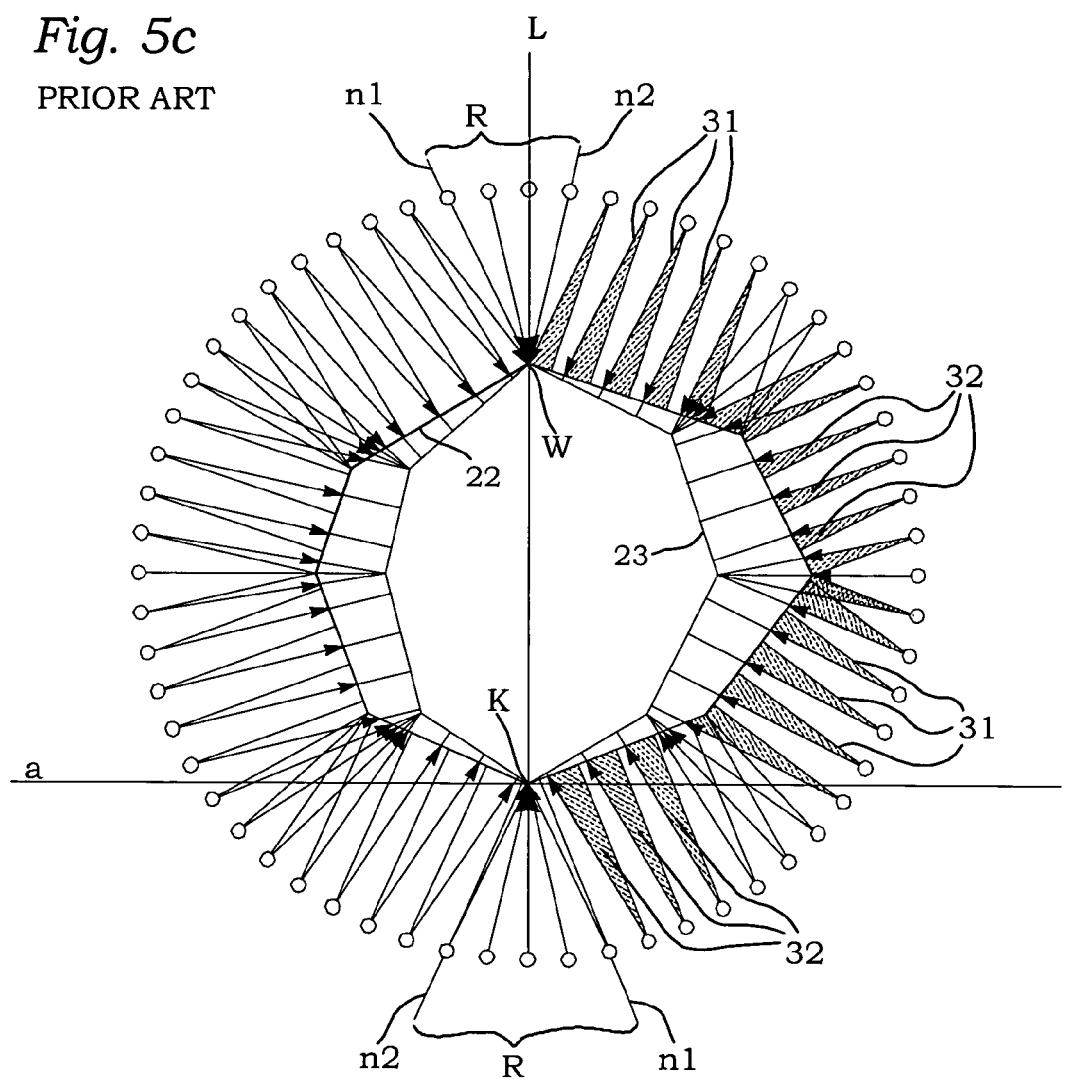
FIG. 5c illustrates a reduced-gamut-clipping method according to the prior art.

FIG. 5c shows with a section in the L-a plane of a device's gamut boundary a modified minimum-distance clipping according to the method described in U.S. Pat. No. 6,414,690. This modified method is similar to the one used by some of the embodiments (described with reference to FIG. 5b) in the sense that out-of-gamut-colors are mapped to points where shortest-distance-vectors to a reduced gamut boundary intersect the gamut boundary of a device. But since the reduced gamut boundary 20 is derived from the device's gamut boundary 19 by scaling it in two—the chromatic ones (a, b)—of its three dimensions while leaving the lightness dimension L unchanged, corresponding surfaces of boundary and reduced boundary are not parallel, i.e., in FIG. 5c's sectional view in the two dimensions L and a, the sides of the inner polygon 23 are not parallel to the sides of the outer one 22, and shortest-distance-vectors 31 perpendicular to sides of the inner polygon 23 are not perpendicular to the sides of the outer one 22. So the results of the unmodified minimum-distance clipping method and this modified method (according to U.S. Pat. No. 6,414,690) differ not only in the regions of the angular sectors at the corners/edges of the device's gamut. This modified method rather maps all out-of-gamut colors to locations different from those to which the unmodified method would map them to; in the drawing triangles 32 indicate this mapping difference. Further, as mentioned above with reference to FIG. 3b, the boundary and the reduced boundary have two vertices W and K in common. At these vertices W and K this modified method does not reduce the above mentioned distortions occurring with the conventional (unmodified) minimum-distance clipping since the radially oriented shortest-distance-vectors towards the reduced boundary 23 intersect the boundary and the reduced boundary in the same points W and K.

Figure 6A:
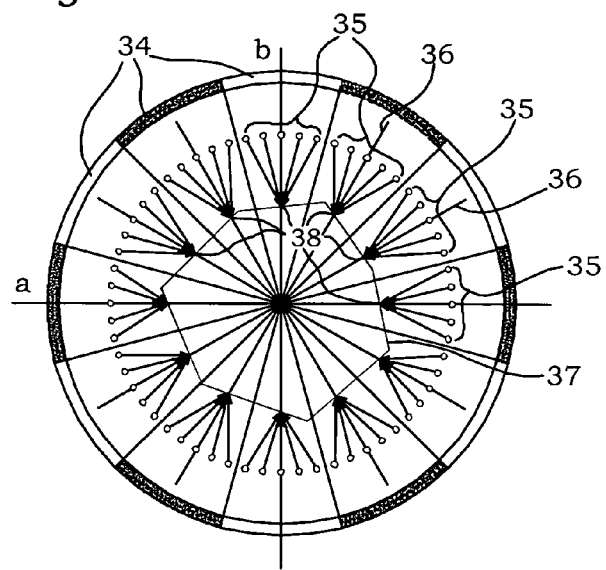
FIG. 6a illustrates a conventional hue sector preserving clipping method.

FIG. 6a shows, with a section perpendicular to the lightness axis, a conventional method of mapping out-of-gamut colors onto intersections of distinct hue leaves 36 and a device's gamut boundary 37 via the shortest distance, a hue sector preserving clipping method. The hue leaves 36 are distributed regularly over the 0 to 360 degrees hue range, which is divided into a number of equally sized hue sectors 34, each hue leaf being the symmetry plane of one of these sectors 34. Since out-of-gamut colors within a hue sector are clipped into the symmetry plane of this sector, this method is a hue sector preserving clipping, also referred to as hue preserving clipping, thereby using the term "hue preserving" in a less strict sense as mentioned herein above. When this mapping method is used, eventually groups 35 of different out-of-gamut colors are clipped to single points 38 on the boundary 37, i.e., the differences of these colors are discarded.

Figure 6B:
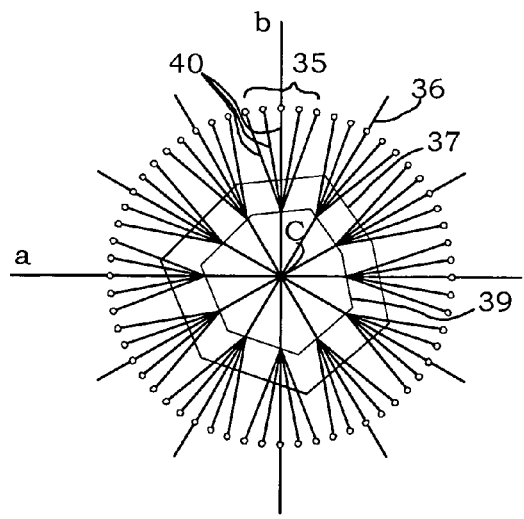
FIG. 6b-c illustrate the present reduced-gamut-clipping method according to some of the embodiments, applied to the conventional hue sector preserving clipping method.
Figure 6C:
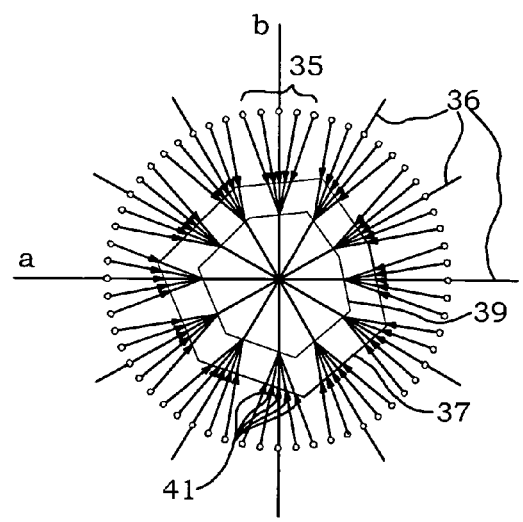

The resulting distortions can be reduced by modifying the conventional hue sector preserving clipping method of FIG. 6a according to some of the embodiments, by applying the reduced-gamut clipping to the conventional hue sector preserving clipping method of FIG. 6a, as is illustrated in FIGS. 6b and 6c:

FIG. 6b shows the first stage in which a reduced gamut boundary 39 is derived from the device's boundary 37 by scaling it towards a scaling center C. Vectors 40 lead from the out-of-gamut colors to the intersections of the hue leaves 36 and the reduced boundary 39;

FIG. 6c shows the second stage in which the final mapping using the hue sector preserving clipping method of FIG. 6a is modified according to some of the embodiments. Groups 35 of different out-of-gamut colors that would be clipped to single points 38 (FIG. 6a) on the boundary 37 when the conventional hue sector preserving clipping method of FIG. 6a were used, are now mapped on the boundary 37 to points spaced apart, indicated in the drawing by small arrow heads 41.

Figure 7A:
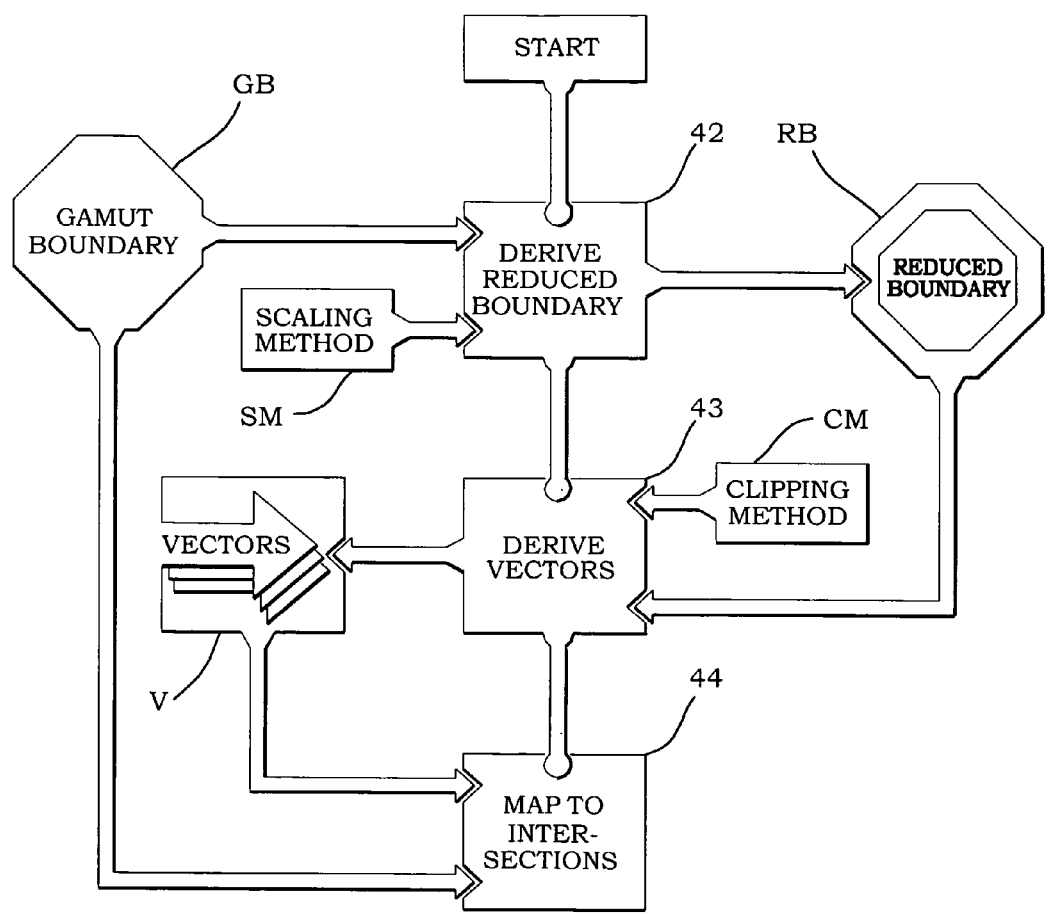
FIG. 7a-c are flow charts illustrating different ways to segment the method execution of the embodiments of FIGS. 4-6.

FIG. 7a is a flowchart outlining a reduced-gamut-clipping method as used by some of the embodiments to map colors not reproducible by a device into reproducible ones. Starting upon three predefined constants, the boundary GB of a device's gamut, a scaling method SM and a clipping method CM, a reduced boundary RB is derived at block 42 as a function of the device's gamut boundary GB and the scaling method SM. At block 43, a set of vectors V is derived as a function of the clipping method CM and the reduced boundary RB derived at block 42. At block 44 intersection points are derived from the vectors of this set V and the device's gamut boundary GB, and out-of-gamut colors are finally mapped to these intersection points.

The scaling method SM used at block 42 is a scaling in all three dimensions of a color space; in some of the embodiments the scaling is a linear scaling towards one scaling center C, and in some of the embodiments the scaling center C resides on the lightness axis of the color space, for example in the middle of the line from the black point K to the white point W of the device's gamut.

The clipping method CM used at block 43 can be any one of conventional clipping methods; in some of the embodiments, for example, a minimum-distance clipping is used as illustrated in FIG. 5b, another example is illustrated in FIG. 6a-c, where a hue-preserving minimum-distance clipping is used.

The operations at block 42, 43 and 44, in these embodiments, are carried out in sequence ("on the fly"). In some of the embodiments, as outlined in FIG. 7b, a reduced boundary RB is derived at block 42 from a gamut boundary GB using a scaling method SM, and the reduced boundary RB is stored permanently to be used on demand.

Figure 7B:
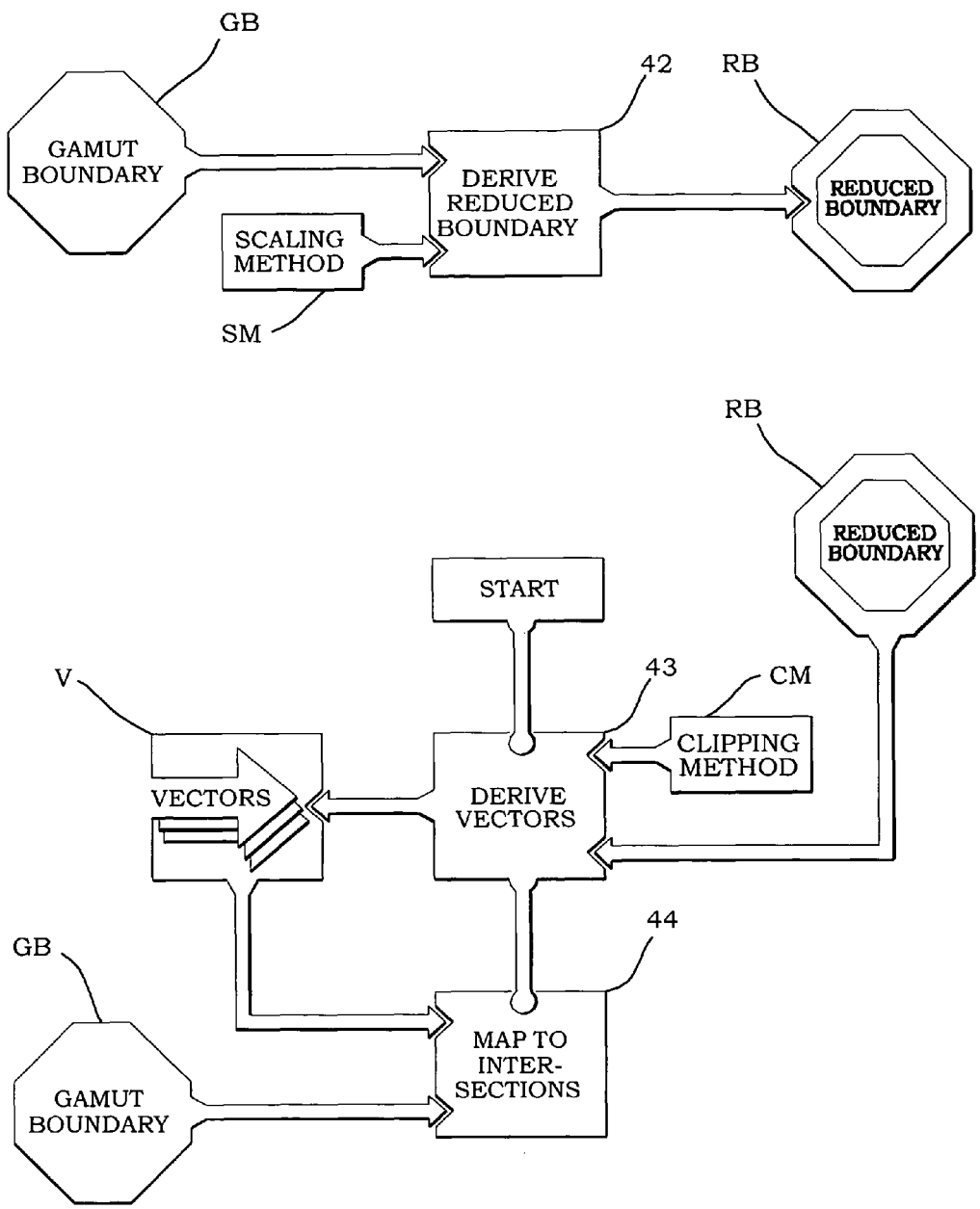

FIG. 7b is a flowchart outlining a reduced-gamut-clipping method which gives the same result as that of FIG. 7a, but its execution is "segmented" in a different manner: As in FIG. 7a, a reduced boundary RB is derived at block 42 from a gamut boundary GB using a scaling method SM. However, the reduced boundary RB is then stored permanently to be used on demand.

At block 43, as in FIG. 7a, a set of vectors V is derived as a function of the clipping method CM and the reduced boundary RB, but now the permanently stored one is used. At block 44 intersection points are derived from the vectors of this set V and the device's gamut boundary GB, and out-of-gamut colors are finally mapped to these intersection points, as in FIG. 7a.

The operations at block 43 and 44, in these embodiments, are carried out in sequence ("on the fly") while the operation at block 42 (deriving the reduced boundary RB) is carried out independently beforehand.

Figure 7C:
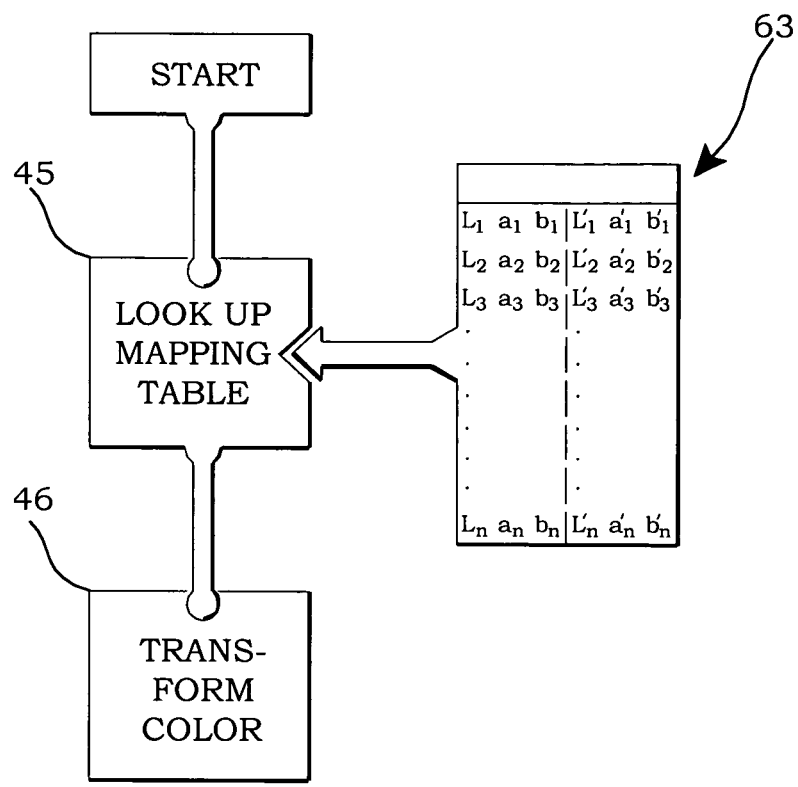

FIG. 7c is a flowchart outlining an embodiment using a mapping table 63. The table is generated for a grid of colors in the color space, called input colors (e.g. $L_1, a_1, b_1$) by deriving the reduced boundary, deriving the vectors and their intersection points with the device's gamut boundary, and finally mapping out-of-gamut colors to these intersection points, as in FIGS. 7a and b, but now the colors mapped to the input colors of the grid are permanently stored in the mapping table 63 as output colors (e.g. $L_1', a_1', b_1'$). For colors of the grid, which are within the device's gamut, input and output colors may be the same.

In this embodiment, based on pre-generated and permanently stored mapping tables 63, for a certain color to be transformed, the corresponding input color in the mapping table 63 and its associated output color are looked up in the mapping table 63 at block 45. Based on this, at block 46, the certain color is then transformed. If the certain color is not identically found in the mapping table 63, the transformation uses interpolation.

FIG. 8 is a high-level diagram of a reproduction system 50, including a printing device 51 (e.g. an ink-jet printer), suitable to print color images on a print media 52, and a computer with a program structure 53, which in some embodiments, is a device separate from the printing device 52, but, in other embodiments is integrated in the printing device 52. The program structure 53 is subdivided into an operating system (OS) layer 54 and an application layer 55. The OS layer 54, for example, includes an operating system 56, e.g. the Macintosh® or Windows® operating system 56. In embodiments with a separate computer, the computer is, for example, a commercially available multi-purpose computer, e.g. arranged to work with the Macintosh® or Windows® operating system. The OS layer 54 also includes input/output modules, such as a network interface 57 and a printer driver 58. The network interface 57 may, inter alia, receive input images, mapping tables, computer programs, reduced-gamut representations etc. over a network 59, e.g. the Internet, typically in the physical form of a propagated signal.

Figure 9:
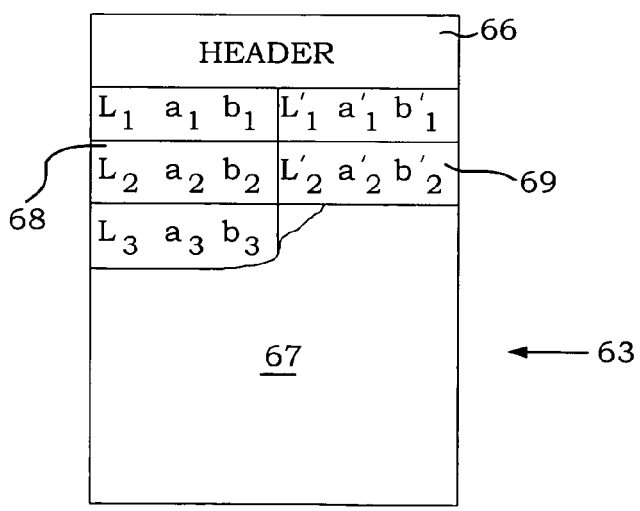
FIG. 9 illustrates a mapping table incorporating an out-of-gamut mapping of some embodiments.

The operating system 56 includes a part 60 which provides color management services (e.g. services in the framework of the ColorSync® or ICM® technologies), basically the service of transforming color values from one color representation into another, including the mapping of out-of-gamut colors, i.e. input colors which are outside the gamut of the printing device 51, into colors printable by it. To this end, the color-management services part 60 is arranged to invoke a color-mapping computer program 61. In one of the embodiments illustrated by FIG. 8, the computer program 61 first derives a reduced gamut of the printing device 52, by reducing the size of the printing device's 52 gamut in all its dimensions, and then performs the color mapping using the reduced gamut, as described above. Since the reduced gamut may be the same for a given printing device and media type, in other embodiments—which are also illustrated by FIG. 8—the reduced gamut has been calculated only once (e.g. by the manufacturer of the printing device 51), and a representation 62 of it, e.g. a parameterized form, is stored in the computer's memory and accessed by the color-management services part 60 to perform color mapping. In those embodiments, color-mapping computer program 61 uses the pre-determined reduced gamut 62 and only performs the actual color mapping, using the reduced gamut, as described above. In still other embodiments which are also illustrated by FIG. 8, not only the reduced gamut is pre-determined, but also the color-mapping is pre-calculated for many colors, according to what has been described above, and the results of this color mapping is represented in a mapping table 63 (FIG. 9) specific for the printing device 51 and a certain media (e.g. in a standardized form of an ICC table) stored in the computer's memory (in FIG. 8, a plurality of mapping tables 63 are shown, which are, for example, different tables for different print media). The mapping table 63 is accessed by the color-management services part 60 to perform the color mapping. Generally, a color to be transformed will be close to two or more input colors for which the mapping table specifies an output color. Basically, the mapped color is then determined by interpolation of the table output colors associated with the table input colors close to the color to be transformed, as usual in table-based color mapping. The method of mapping out-of-gamut colors based on a gamut reduced in all its dimensions, as described above, is inherent in the association of input colors with correspondingly determined output color represented in the profile 63 (FIG. 9). The mapping table 63 may also include other mappings, e.g. a mapping from one color space into another, such as from a Lab representation to a CMYK or RGB representation.

User applications, such as the color-management application 64, are processed in the application layer 55. The color-management application 64 may be an application for explicit color management, such as Adobe® Photoshop®, including a color management module (CMM) 65.

Both applications, such as the color-management application 64, and device drivers, such as the printer driver 58, can make use of the color management services 60 provided by the operating system 56. For example, if an image represented in the color-management application's intermediate color space (e.g. CIE LAB, Adobe®RGB, sRGB, etc.) is to be transformed such that out-of-gamut colors are mapped in the manner described above, the color management application 64 passes the input image data to the color management services 60, together with a request to transform them, and the color management services 60 perform the requested transformation by invoking the computer program 61 and/or using the stored reduced gamut 62 profile and/or using the mapping profile 62, and return the image data transformed (if requested, at the same time transformed into a CMYK representation) to the color-management application 64. The image may then be printed by the printing device 51 via the printer driver 58. In other cases in which no application for explicit color management is used, the printer driver 58 may receive input image data, pass these data to the color management services 60, together with a transformation request, whereupon the color management services 60 transforms them in the manner described, by invoking the computer program 61 and/or using the stored reduced gamut 62 profile and/or using the mapping profile 62. The printer driver 58 outputs the transformed data (which will also be transformed, e.g. into a CMYK representation by the printer driver 58) to the printing device 51 to cause it to print an image with the out-of-gamut colors mapped in the manner described.

FIG. 9 illustrates the mapping table 63 in more detail. In the example shown, the mapping table 63 has a header 66 and mapping data 67 in the form of a list of input color values 68 (e.g. $L_1$, $a_1$, $b_1$) and, associated with them, output colors 69 (e.g. $L_1'$, $a_1'$, $b_1'$). The mapping table 63 represents the results of the reduced-gamut mapping method described herein for a grid of discrete input colors; as mentioned above, a mapping of colors between the input colors of the grid is, e.g. based on interpolation.

Thus, the described embodiments of out-of-gamut-mapping methods are a modification to different known clipping methods, which enables out-of-gamut colors to be mapped in a manner which preserves their color-difference properties to a greater extent.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of mapping colors which are not reproducible by a reproduction device having a color gamut with a gamut boundary, and are therefore outside the reproduction device's color gamut, to reproducible colors, comprising:
   deriving by a computer, in a three-dimensional color space, a reduced gamut with a reduced-gamut boundary from the reproduction device's gamut by reducing its size in all three dimensions;
   determining by the computer reduced-gamut clipping-vectors by clipping the out-of-gamut colors onto the reduced-gamut boundary;
   mapping the out-of-gamut colors to those colors at which the reduced-gamut clipping-vectors intersect the reproduction device's gamut boundary,
   so that out-of-gamut colors associated with clipping-vectors of different directions that are clipped onto the same point, or adjacent points, of the reduced-gamut boundary are mapped to points spaced apart, or spaced farther apart, on the reproduction device's gamut boundary.

2. The method of claim 1, wherein shape and position of the reduced gamut is obtained by scaling the reproduction device's gamut along each of its three dimensions towards at least one point residing inside the reproduction device's gamut as at least one scaling center.

3. The method of claim 2, wherein the at least one scaling center is located on an achromatic axis of a color space related to the reproduction device's gamut.

4. The method of claim 2, wherein the scaling is a linear scaling towards a single scaling center.

5. The method of claim 1, wherein the clipping to determine the reduced-gamut clipping-vectors is a minimum-color-difference clipping.

6. The method of claim 1, wherein the clipping to determine the reduced-gamut clipping-vectors is hue-preserving.

7. The method of claim 1, wherein the clipping to determine the reduced-gamut clipping-vectors is a hue-preserving minimum-color-difference clipping.

8. The method of claim 1, wherein the reduced-gamut boundary has at least one of a corner and an edge, and wherein the same point of the reduced gamut boundary onto which out-of-gamut colors are clipped is on the corner or edge.

9. The method of claim 1, wherein the reduced-gamut boundary has at least one high-curvature region, and wherein the adjacent points onto which out-of-gamut colors are clipped are in the high curvature region.

10. An image reproduction system having a color gamut with a gamut boundary, arranged to map colors in image data, which are outside the reproduction system's gamut and are therefore not reproducible, into reproducible colors, the system comprising one or more computers comprising:
   a gamut derivation component configured to derive, in a three-dimensional color space, a reduced gamut with a reduced-gamut boundary from the reproduction system's gamut by reducing the reproduction system's gamut size in all three dimensions;
   a clipping vector determination component configured to determine reduced-gamut clipping-vectors by clipping the out-of-gamut colors onto the reduced-gamut boundary;
   a mapping component configured to map the out-of-gamut colors to those colors at which the reduced-gamut clipping-vectors intersect the reproduction system's gamut boundary,
   wherein out-of-gamut colors associated with clipping-vectors of different directions that are clipped onto the same point, or adjacent points, of the reduced-gamut boundary are mapped to points spaced apart, or spaced farther apart, on the reproduction system's gamut boundary.

11. The image reproduction system of claim 10, further comprising:
   a color-mapping table, wherein the mapping component is configured to map colors using the color-mapping table.

12. The image reproduction system of claim 10, wherein shape and position of the reduced gamut is obtained by scaling the reproduction system's gamut along each of its three dimensions towards at least one point residing inside the reproduction system's gamut as at least one scaling center.

13. The image reproduction system of claim 12, wherein the at least one scaling center is located on an achromatic axis of a color space related to the reproduction system's gamut.

14. The image reproduction system of claim 10, wherein the clipping to determine the reduced-gamut clipping-vectors is a minimum-color-difference clipping.

15. The image reproduction system of claim 10, wherein the clipping to determine the reduced-gamut clipping-vectors is hue-preserving.

16. The image reproduction system of claim 10, wherein the clipping to determine the reduced-gamut clipping-vectors is a hue-preserving minimum-color-difference clipping.

17. A computer program product, comprising a non-transitory computer-readable medium with program code for mapping colors which are not reproducible by a reproduction device having a gamut with a gamut boundary, and are therefore outside the reproduction device's gamut, to colors reproducible by the reproduction device, the program code upon execution causing a computer system to:

derive, in a three-dimensional color space, a reduced gamut with a reduced-gamut boundary from the reproduction device's gamut by reducing the reproduction device's size in all three dimensions;

determine reduced-gamut clipping-vectors by clipping the out-of-gamut colors onto the reduced-gamut boundary;

map the out-of-gamut colors to those colors at which the reduced-gamut clipping-vectors intersect the reproduction device's gamut boundary, wherein out-of-gamut colors associated with clipping-vectors of different directions that are clipped onto the same point, or adjacent points, of the reduced-gamut boundary are mapped to points spaced apart, or spaced farther apart, on the reproduction device's gamut boundary.

18. The computer program product of claim 17, wherein the clipping to determine the reduced-gamut clipping-vectors is a minimum-color-difference clipping.

19. The computer program product of claim 17, wherein the clipping to determine the reduced-gamut clipping-vectors is hue-preserving.

* * * * *